US005793882A

United States Patent [19]

[11] Patent Number: 5,793,882

[45] Date of Patent: *Aug. 11, 1998

Piatek et al.

[54] SYSTEM AND METHOD FOR ACCOUNTING FOR PERSONNEL AT A SITE AND SYSTEM AND METHOD FOR PROVIDING PERSONNEL WITH INFORMATION ABOUT AN EMERGENCY SITE

[75] Inventors: John T. Piatek, Williamsburg; Fredrick M. Muller, Traverse City; Brad W. Schnaidt, Grawn; Wayne D. Hanna, Traverse City, all of Mich.

[73] Assignee: Portable Data Technologies, Inc., Traverse City, Mich.

[ * ] Notice: The term of this patent shall not extend beyond the expiration date of Pat. No. 5,596,652.

[21] Appl. No.: 785,992

[22] Filed: Jan. 21, 1997

Related U.S. Application Data

[63] Continuation-in-part of Ser. No. 409,308, Mar. 24, 1995, Pat. No. 5,596,652.

[51] Int. Cl.[6] .................................... G06K 9/00

[52] U.S. Cl. .................... 382/115; 235/462; 340/286.05; 340/825.31

[58] Field of Search .................................... 382/115, 183, 382/313; 235/462; 340/825.31, 286.05

[56] References Cited

U.S. PATENT DOCUMENTS

| | | | |
|---|---|---|---|
| 5,113,445 | 5/1992 | Wang | 380/51 |
| 5,243,655 | 9/1993 | Wang | 380/51 |
| 5,266,780 | 11/1993 | Kamata et al. | 705/11 |
| 5,337,361 | 8/1994 | Wang et al. | 380/51 |
| 5,343,446 | 8/1994 | Simmons et al. | 368/251 |
| 5,393,965 | 2/1995 | Bravman et al. | 235/383 |
| 5,399,846 | 3/1995 | Pavlidis et al. | 235/462 |
| 5,406,491 | 4/1995 | Lima | 701/210 |
| 5,459,657 | 10/1995 | Wynn et al. | 705/32 |

OTHER PUBLICATIONS

Actionline, John T. Piatek, "A New Dimension In Bar Code Technology," Dec. 1993, (pp. 24–26).

Financial World®, Srikumar S. Rao, "Tomorrow's Rosetta Stones," Nov. 22, 1994, (pp. 70–72).

ID Systems, Craig Harman, "Two–Dimensional Standards and ISO Update," Nov. 1994, (pp. 22, 24 & 100).

Traverse City Record Eagle, T.M. Shultz, "GT County Firefighters to Test New Bar Coding Data System," Tuesday, Jul. 6, 1994.

Maryland/DC Firefighter, Brad Schnaidt, "The Fire Service and Barcodes–Approaching the 21st Century," vol. 9, No. 1, Autumn 1994 (pp. 155, 157, & 159).

The New York Times, Barnaby J. Feder, "For Bar Codes, an Added Dimension," Wednesday, Apr. 24, 1991.

Automatic I.D. News, Brad Schnaidt, "In the Line of Fire: 2–D Bar Codes Track Whose Battling Fires and Provide Rescue Workers With Firefighter's Medical History," Aug. 1994.

Fortune, Mark Alpert, "Building a Better Bar Code," Jun. 15, 1992.

Lucas, Andi, "Sailors Don't Get Washed Away With RF/ID," *Automatic I.D. News,* Oct. 1996, p. 18.

*Primary Examiner*—Joseph Mancuso
*Assistant Examiner*—Jayanti K. Patel
*Attorney, Agent, or Firm*—Price, Heneveld, Cooper, DeWitt & Litton

[57] ABSTRACT

A personnel accountability system accounting for personnel reporting to a site. The personnel accountability system includes an information receiving device, a processor, and a display. The information receiving device is provided for receiving information from a data storage device carried by the personnel or from the personnel directly. The received information pertains to the personnel, and may include identification, qualification, and/or medical information. Upon receiving the data, the system subsequently stores and displays the received information. This system may also be used to receive information regarding a site.

40 Claims, 9 Drawing Sheets

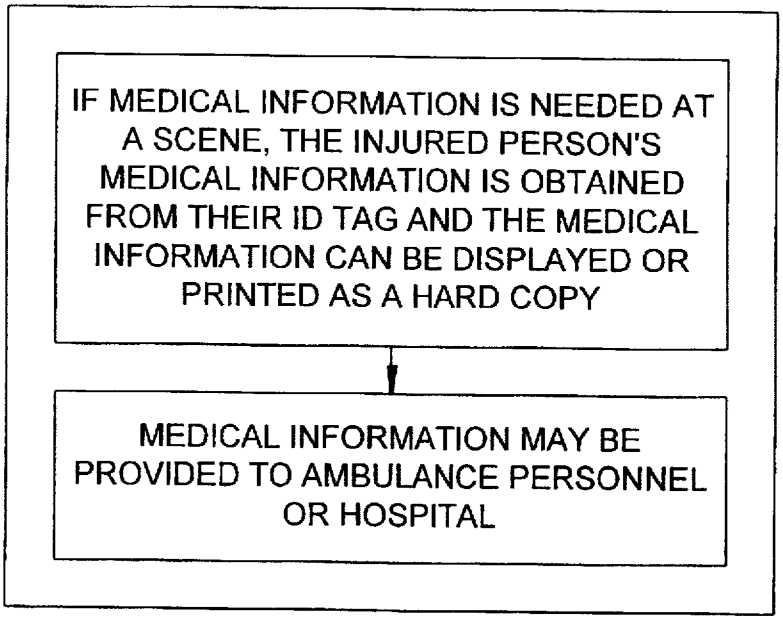

Fig. 6

MEDICAL I.D. CARD

NAME JOHN DOE UNIT GT 1 ID# 001
ADDRESS 1111 EASY STREET
CITY/ST BEVERLY HILLS, CA 90210 HOME PHONE 555-1111
SPOUSE JANE DATE OF BIRTH 01/01/51

MEDICAL INFORMATION

BLOOD TYPE O PHYSICIAN WELBY 555-2222
PREFERRED HOSPITAL GENERAL INSURANCE CO BLUE CROSS
POLICY # 1234567-89012345
ALLERGIES CATS, POLLEN, PENICILLAN
MEDICAL CONDITION ONE KIDNEY REMOVED
SPECIAL INFORMATION CURRENTLY UNDER MEDICATION-4MG ERYTHROMYCIN DAILY

IN CASE OF EMERGENCY CONTACT

| NAME | PHONE | RELATIONSHIP |
|---|---|---|
| JANE | 555-1111 | SPOUSE |
| MARY | 1-555-3333 | MOTHER |
| SALLY | 813-555-4444 | SISTER |
| SHARON | 555-5555 | IN LAW |
| JIM | 312-555-6666 | BROTHER |

Fig. 7

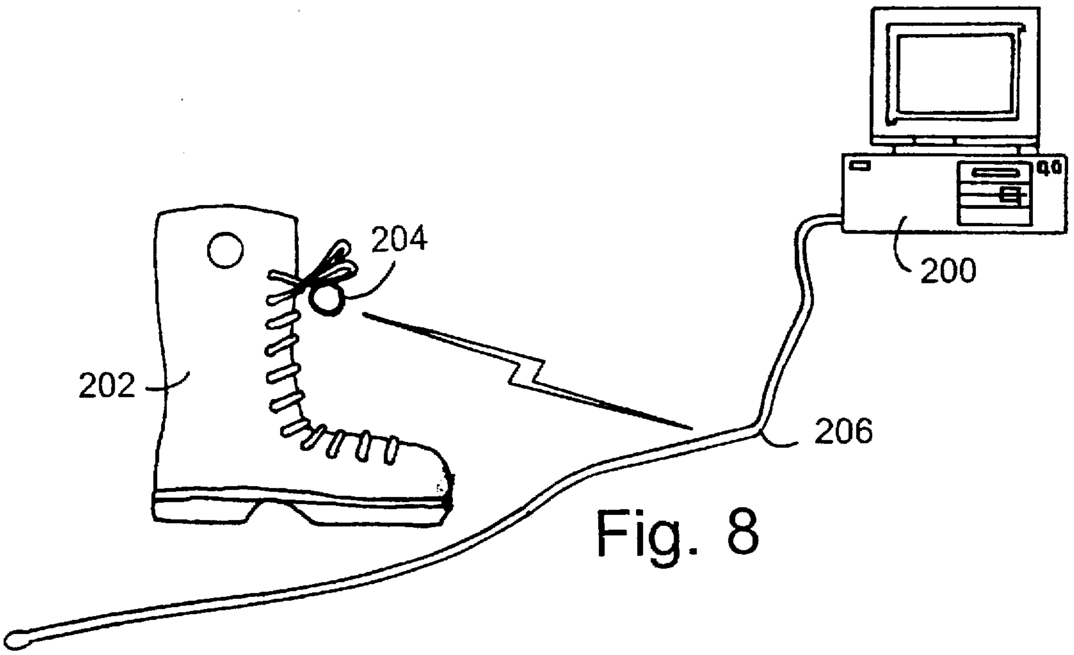
Fig. 8
Fig. 9
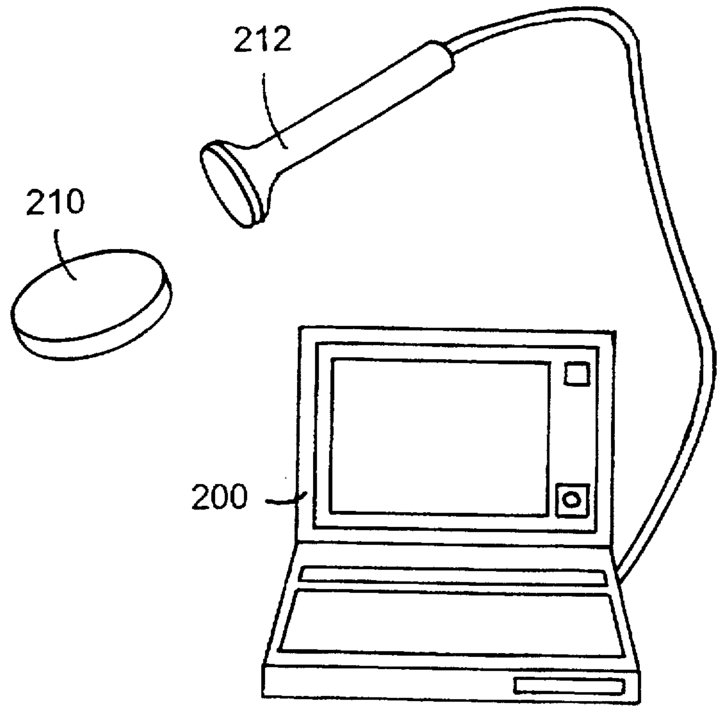

SYSTEM AND METHOD FOR ACCOUNTING FOR PERSONNEL AT A SITE AND SYSTEM AND METHOD FOR PROVIDING PERSONNEL WITH INFORMATION ABOUT AN EMERGENCY SITE

CROSS-REFERENCE TO RELATED APPLICATIONS

This application is a continuation-in-part application of U.S. Pat. application Ser. No. 08/409,308, filed on Mar. 4, 1995, now U.S. Pat. No. 5,596,652 the entire disclosure of which is incorporated herein by reference.

BACKGROUND OF THE INVENTION

The present invention relates to a system and method for accounting for personnel at a site. More particularly, the present invention relates to a system and method for accounting for firefighting personnel at the scene of an emergency.

Nearly every fire department faces the problems of accounting for its personnel at the scene of an emergency, having an accurate and readily accessible medical history for any personnel that are injured, and knowing what is in a building before arriving on the scene, and entering it.

Presently, to account for its personnel at a scene of an emergency, a fire department might require firefighters reporting to a scene to report to an incident commander who will assign the firefighter to a particular sector or subsector of the emergency site. Ideally, the incident commander will decide which sector of the scene to assign the firefighter based upon the firefighter's training and experience. However, when dealing with a number of volunteer firefighters or firefighters from other districts or departments, the incident commander may not know the level of training and experience of the reporting firefighter. As a result, firefighters may inadvertently be placed at risk of serious injury. The incident commander may expose him or herself and the fire department to a liability suit should a firefighter be injured after being assigned to a sector having a particular type of fire that the firefighter is not qualified to fight.

Additionally, an incident commander would ideally know which firefighters are assigned to each sector or subsector of the emergency site and would also know when and how long the firefighters have been located in their assigned sectors. By knowing which firefighters are assigned to which sectors, the incident commander can more effectively assign and reassign firefighters to the various sectors. Further, by knowing when and how long a firefighter has been within a particular sector, the incident commander can determine whether a particular firefighter has been in the particular sector for too long and whether the firefighter should be reassigned for temporary rehabilitation (rehab). Additionally, the fire department or medical personnel may determine how long a particular firefighter was exposed to toxic fumes in order to determine the best course of treatment for the firefighter. Unfortunately, the only way for the fire department to keep such records would be to manually maintain a notebook including this information. Such notebooks are impractical to maintain at the scene of an emergency where there may be excessive smoke and water that could damage the notebook. Furthermore, not only does making the necessary entries into the notebook take a substantial amount of time, but the time required to subsequently look up the desired information makes the use of notebooks even more impractical.

The problems relating to firefighter accountability and record-keeping on the scene have been magnified greatly in the recent past due to regulations put on fire departments by state and federal occupational safety and health administrations (OSHA). When assigning firefighters to various sectors and subsectors, an incident commander would certainly benefit by having more information regarding what potential dangers may be present in each sector and subsector in order to ensure that the firefighters assigned to the sectors and subsectors are qualified to deal with these potential dangers. For example, if an incident commander knew that a particular subsector of a building contained certain hazardous materials, the incident commander could assign firefighters to this subsector who are qualified to deal with those hazardous materials.

Firefighters would additionally benefit by knowing what is in a building before arriving on the scene and entering the building. By knowing the layout and contents of a building before entering it, firefighters increase their safety and improve their ability to fight the fire. Further, it would be desirable if firefighters know where utility shut-offs are before entering a building. In order to have this information available at the scene, fire departments have had to haul volumes of documents to the scene and expend valuable time searching through these documents at the scene to locate the needed information pertaining to the building. The fire departments in some large municipalities have been known to maintain all of this documentation in the fire chiefs car equipped with special air shocks to support the weight of these documents. Clearly, when dealing with a large and spreading fire, there may be no time to obtain the desired information. Additionally, the desired information frequently does not arrive at the scene before firefighters arrive at the scene and enter the building. Moreover, updating and maintaining these records is burdensome and time consuming.

In view of the inherent danger in fighting fires, the odds that a firefighter shall require medical attention are higher than usual. Therefore, it would be desirable to maintain the medical history of each firefighter at the site. However, maintaining and transporting documentation having this information presents additional burdens upon the fire department. This problem is amplified when numerous volunteers and firefighters from other districts are called to the scene of an emergency.

The above-noted personnel accountability problems are not strictly limited to accounting for firefighting personnel. Other emergency services, such as the National Guard, police, and paramedics, also experience the same or similar personnel accountability problems. Further, other non-emergency service employers may also experience at least some of these same or similar problems when attempting to account for their employees, for example, construction firms that wish to account for the construction workers at a construction site, an oil or gas company wishing to account for personnel on an oil rig or at an oil or gas field, a mining company wishing to track an account for miners at a mining a site, and forest services wishing to account for the locations and the tasks assigned to forest rangers.

SUMMARY OF THE INVENTION

Accordingly, the present invention has been made to overcome the above problems. The personnel accountability system of the present invention easily and rapidly provides the incident commander, the firefighters, and medical personnel the information they require to perform their respective tasks in a safe and effective manner without requiring a fire department to maintain, transport, and sort through numerous documents. More particularly, the present invention permits a firefighter arriving in the first vehicle on the scene to obtain and review site information, which may be located in a lockbox at or near the scene. This site information may include floor plans, blueprints, interior photographs, fire inspection reports, hazardous material reports, material safety data sheets (MSDS), Tier-Two reports, which are the summary of all the material safety data sheets for chemicals, spill abatement procedures, the location and identification of utility shut-offs, special information, and emergency contact information. Further, at a site where a system is in place for tracking the location of people within the site, the site information may identify whether any individuals are trapped within the site and may provide their location within the site. Thus, by allowing the first firefighter on the scene to obtain this valuable information, the firefighters subsequently arriving at the scene may be provided with information that will increase their safety, improve their ability to fight the fire, and increase the likelihood that individuals trapped on the site may be rescued.

Additionally, the present invention allows an incident commander to log in and obtain qualification information on each firefighter as they arrive on the scene and to quickly assign the firefighters to sectors or subsectors of the scene based upon their qualifications. By simultaneously assigning a firefighter to a particular sector and logging in the firefighter, the incident commander can maintain readily accessible records of which firefighter is in which sector at any particular time and may determine how long the firefighter has been in a particular sector.

Another aspect of the personnel accountability system of the present invention is that it provides medical information associated with an injured firefighter to medical personnel at the scene without requiring the fire department or the medical personnel to maintain this medical information. The medical information may include the firefighter's medical history, allergies, medications being taken, hospital preference, insurance information, doctor's name and telephone number, and a list of individuals to contact in case of an emergency.

Additional features and advantages of the invention will be set forth in part in the description which follows and in part will be apparent from the description, or may be learned by practice of the invention.

To achieve these and other advantages, and in accordance with the purpose of the invention as embodied and broadly described herein, the personnel accountability method of the present invention includes the steps of transporting a portable information receiving device to a site and using it to receive machine-recognizable information that is associated with a person arriving at the site and includes the person's identification, in order to log that person into the computer, determining the person's qualifications based upon information obtained by processing the person's information received by the information receiving device so that the person arriving at the site can be assigned to a task and/or location to which the person is qualified to work, assigning the person to a task and/or location of the site based upon the person's qualifications, and recording in the computer the task and/or location to which the person is assigned. Such machine-recognizable information may be presented using radio frequency identification (RF I.D.), infrared, satellite, or sonic/voice recognition technologies, touch memory devices, smart cards, magnetic stripes, or one- or two-dimensional bar codes.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings, which are incorporated in, and constitute a part of, this specification illustrate several embodiments of the invention and together with the description, serve to explain the objects, advantages, and principles of the invention. In the drawings:

FIG. 6 is a flow diagram showing the flow of events that would typically occur to obtain medical information using the present invention;

FIG. 7 is a graphic illustration of an exemplary display screen showing medical information that may be provided in a medical information tag;

FIG. 8 is a perspective illustration of an implementation of the present invention according to a first embodiment;

FIG. 9 is a perspective illustration of an implementation of the present invention according to a second embodiment;

DESCRIPTION OF THE PREFERRED EMBODIMENTS

In allowed U.S. patent application Ser. No. 08/409,308, an implementation of a personnel accountability system is described that utilizes machine-readable data, such as two-dimensional bar codes, carried by the personnel to store data representing information pertaining to the personnel. Although the use of two-dimensional bar codes as the medium for storing the machine-readable data represents the most preferred embodiment when used for tracking firefighting personnel, other alternative implementations and embodiments of a personnel accountability system have been found to be suitable for use in firefighter accountability and, perhaps more preferable with respect to other applications such as accounting for construction workers, military personnel, forest rangers, workers on a floating oil/gas platform, etc. The alternative implementations are described below.

Figure 1:
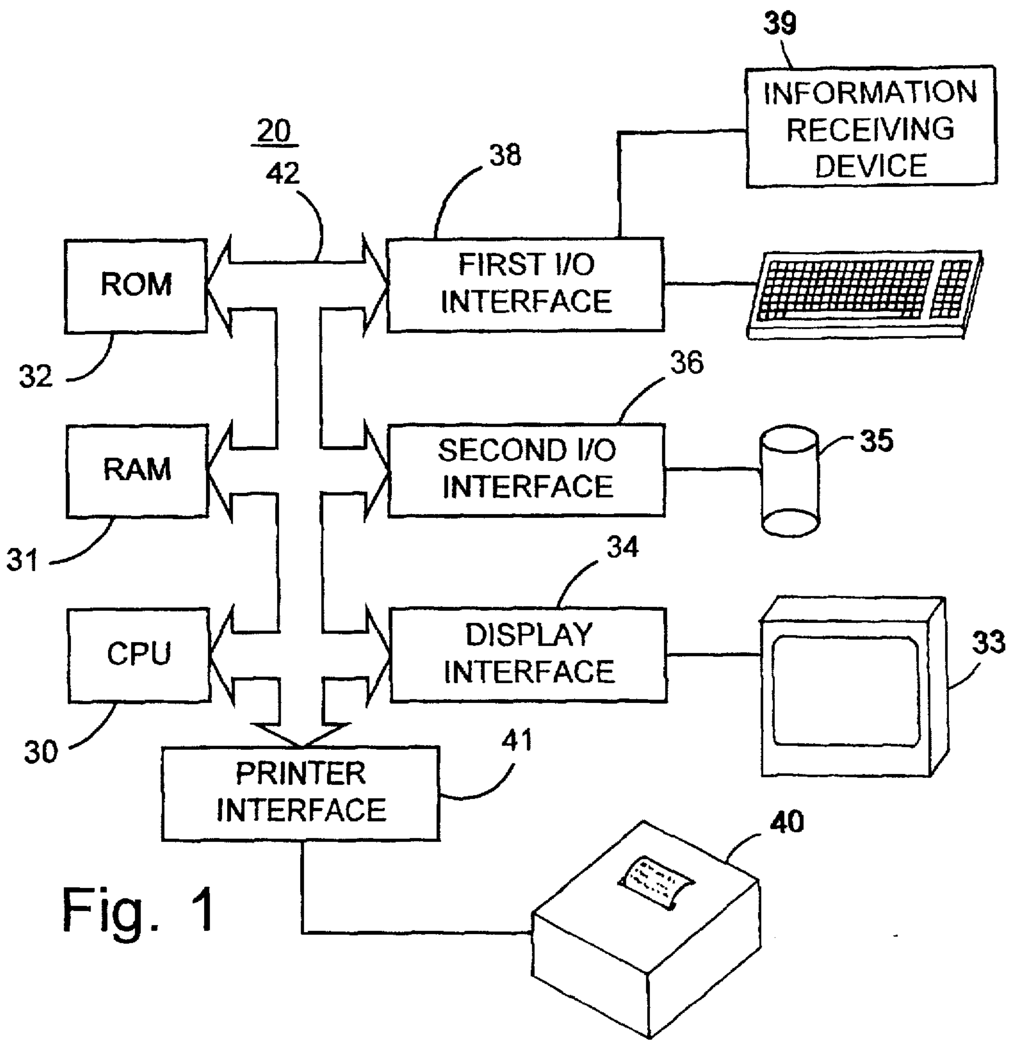
FIG. 1 is a block diagram illustrating a computer hardware system that may be utilized in implementing the present invention.

FIG. 1 shows an example of one computer hardware system 20 that may be used, in whole or in part, to implement the various embodiments of the personnel accountability system of the present invention. As shown in FIG. 1, computer hardware system 20 includes a central processing unit (CPU) 30, a random access memory (RAM) 31, a read only memory (ROM) 32, a display monitor 33, a display interface 34 connected to display monitor 33, a data storage device 35, a first input/output (I/O) interface 36 connected to data storage device 35, a keyboard 37, a second I/O interface 38 connected to keyboard 37, an information receiving device 39 connected to second I/O interface 38, a printer 40, a printer interface 41 connected to printer 40, and a system bus 42 for interconnecting CPU 30, RAM 31, ROM 32, display interface 34, first I/O interface 36, second I/O interface 38, and printer interface 41. As described below, information receiver 39 may take any appropriate form for receiving data from the particular form of data storage device used for the particular embodiment or for receiving machine-recognizable information that may be processed by a computer. Preferably, data storage device 35 is a computer hard disk drive.

As will be apparent to those of ordinary skill in the art, with the possible exception of information receiver 39 and printer 40, the components of computer hardware system 20 may be incorporated into a personal computer and are preferably incorporated into a portable or laptop computer. However, as will become apparent from the following description of the present invention, certain components of computer hardware system 20 may be eliminated depending upon the manner in which it is used within the confines of the present invention. For example, if computer hardware system 20 were used solely for producing and storing the data carried by the personnel, information receiver 39 may be eliminated. On the other hand, if computer hardware system 20 were used solely for receiving data and displaying the data contained therein, keyboard 37 may be eliminated and printer 40 would become optional unless one wished to print out information displayed on display monitor 33. By eliminating keyboard 37 and/or printer 40, computer hardware system 20 may be implemented in a very portable, small integral device. Clearly, the particular form taken by computer hardware system 20 will depend upon the manner and environment in which the system is used. Further, computer system 20 may also be configured with a cellular telephone, a global positioning system (GPS), digital camera, facsimile machine, image scanner, or FAX/Modem.

Having generally described the components for implementing the personnel accountability system of the present invention, reference will now be made in detail to the present preferred embodiments for implementing the present invention, examples of which are illustrated in FIGS. 8 through 16.

FIG. 8 shows an implementation of the present invention according to first embodiment wherein the I.D. tags may be configured as RF I.D. tags 204 that may be attached to the firefighter's boots 202 or shoelaces or any other equipment or gear carried on the firefighter. In this implementation, information receiving device 39 includes a portable receiver antenna wire 206 coupled to a computer system 200 that includes the appropriate circuitry for demodulating a received RF signal. Preferably, antenna wire 206 is a near proximity antenna that is capable of receiving a low power RF signal from the RF I.D. tags 204 when the firefighters are in near proximity to antenna wire 206 that is positioned at a staging area where the firefighters are logged into the system. Preferably, the RF I.D. tags 204 and portable receiver antenna wire 206 are similar to those available from either Motorola or Micron.

FIG. 9 shows a second embodiment of the present invention whereby the I.D. tags provided on the firefighters are implemented using touch memory buttons 210 and the information receiving device 39 is implemented using an appropriate touch memory receiver 212 coupled to a computer 200. In this implementation, the touch memory button would be provided in an easily-accessible location on the firefighter's gear such that the incident commander may readily make contact with the touch memory button 210 using receiver 212 and thereby read all the information stored therein. Such touch memory devices and reading equipment are available from Dallas Semiconductor.

Figure 10:
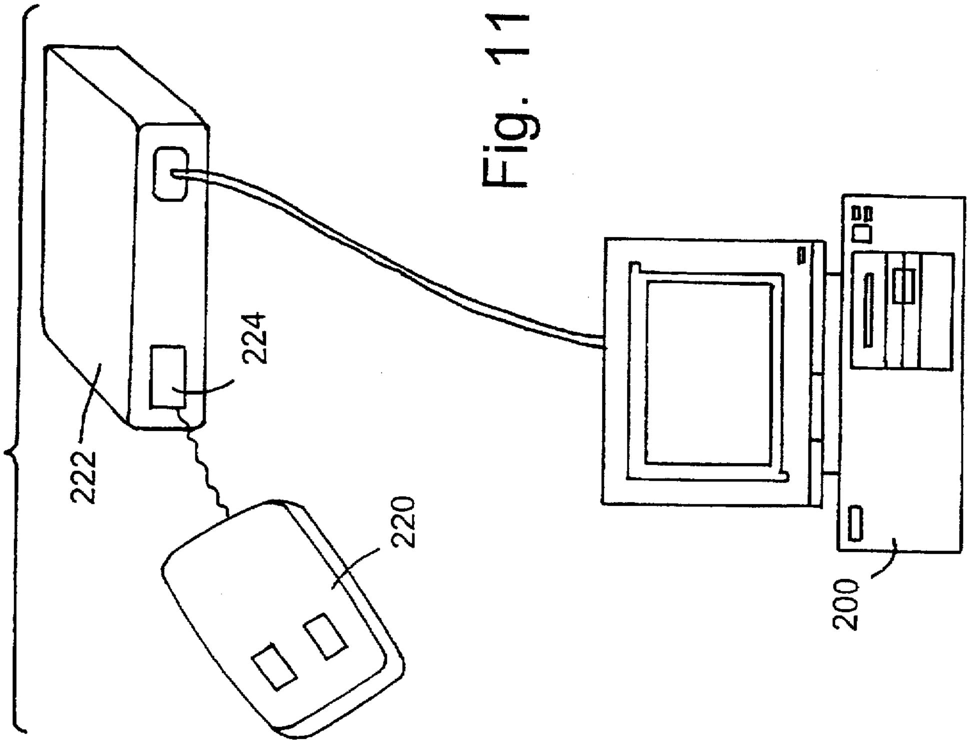
FIG. 10 is a perspective illustration of an implementation of the present invention according to a third embodiment.

FIG. 10 shows a third embodiment of the present invention in which the I.D. tags are implemented using infrared transmitters 220 and the information receiving device 39 is implemented using an infrared receiver 222 that is connected to computer 200. In operation, a firefighter would carry infrared transmitter 220 in or on his gear and activate transmitter 220 to transmit an infrared signal through a receiving window 224 on receiver 222 so as to transmit from a memory in transmitter 220 information identifying the firefighter that is modulated onto the infrared beam.

Figure 11:
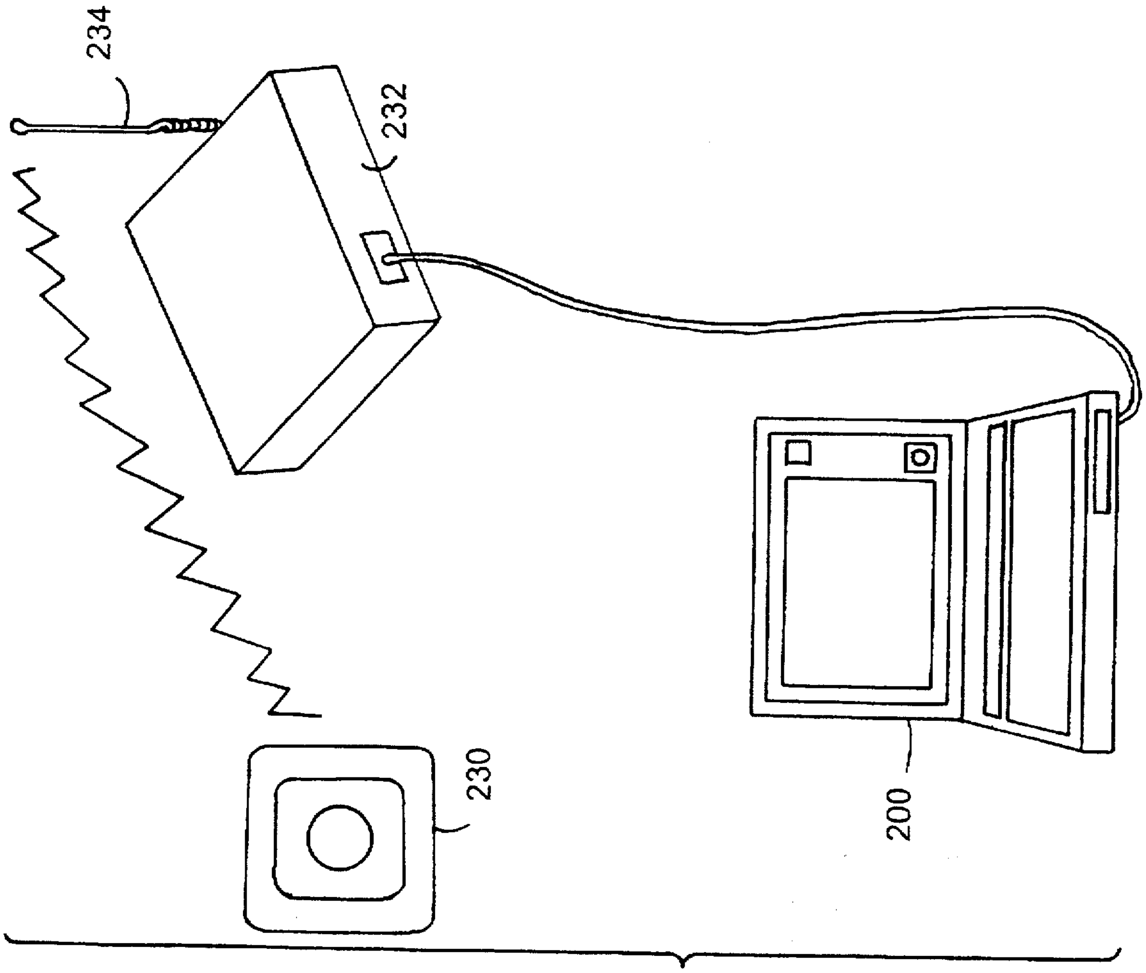
FIG. 11 is a perspective illustration of an implementation of the present invention according to a fourth embodiment.

FIG. 11 shows a fourth embodiment of the present invention that is similar to the first and third embodiments. In this embodiment, the I.D. tags are implemented using an RF I.D. transmitting chips 230 and the information receiving device 39 is implemented using an RF receiver 232 that is coupled to computer 200. In practice, RF I.D. transmitting chip 230 is carried by the firefighter and is activated by pressing a button included thereon to transmit modulated information from its memory to an antenna 234 of receiver 232.

Figure 12:
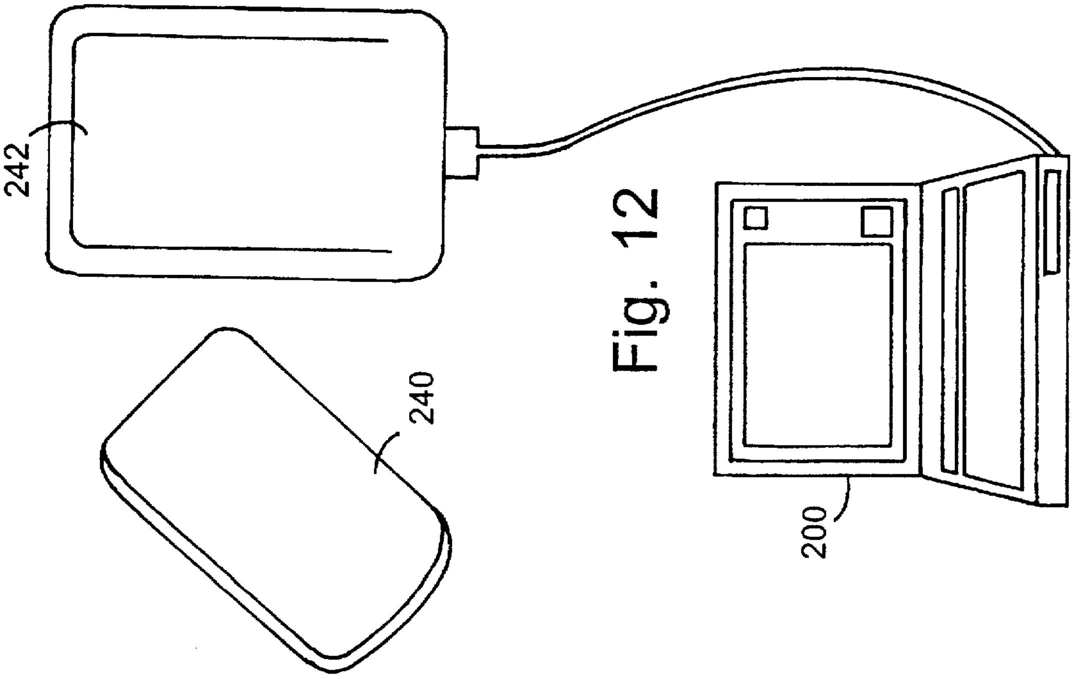
FIG. 12 is a perspective illustration of an implementation of the present invention according to a fifth embodiment.

FIG. 12 shows a fifth embodiment of the present invention whereby the I.D. tags are implemented using smart cards 240 and the information receiving device 39 is implemented using a smart card reading device coupled to computer 200. A smart card 240 would be carried by the firefighter and would include the firefighter's identification and other information stored in the memory chip included on card 240. When arriving at the staging area, the incident commander would insert the smart card 240 into reading device 242 to read the information from the card's memory. Such smart cards and smart card reading devices are available from various manufacturers.

Figure 13:
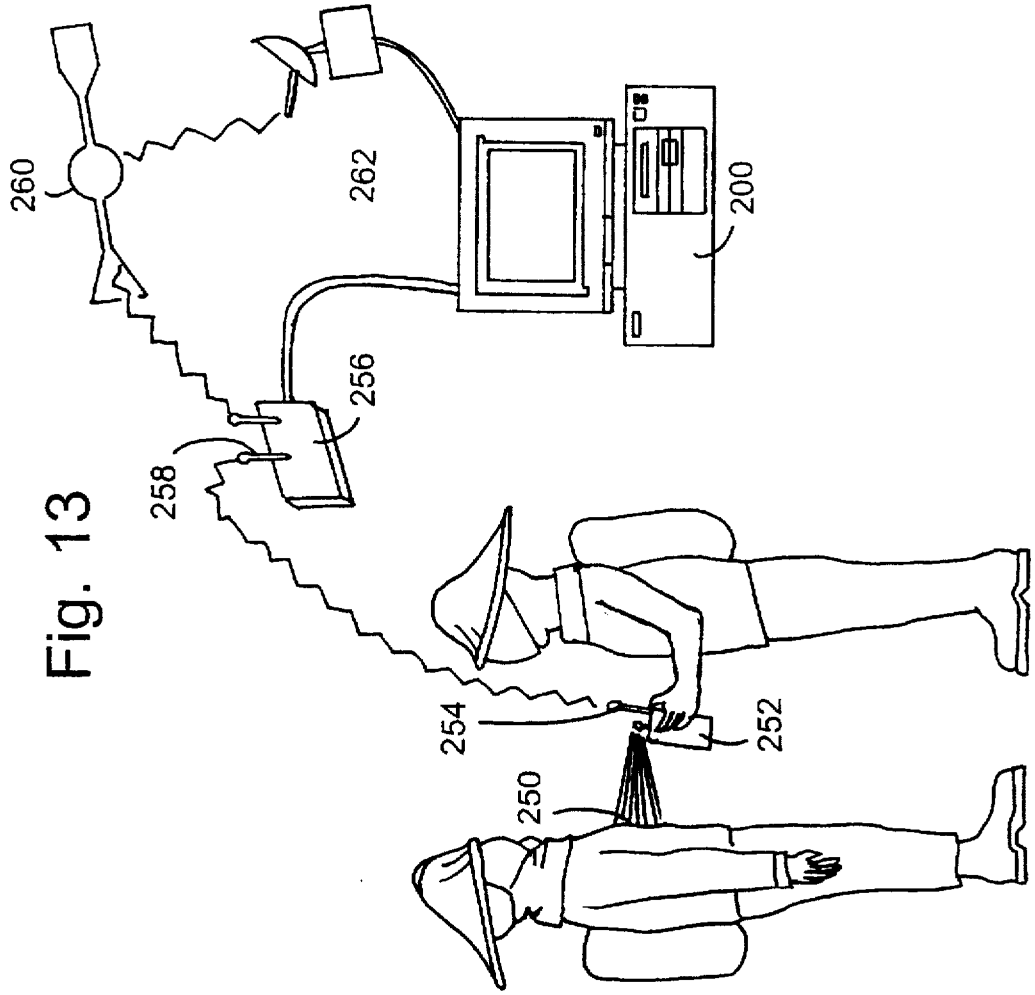
FIG. 13 is a perspective illustration of an implementation of the present invention according to a sixth embodiment.

FIG. 13 shows a sixth embodiment of the present invention whereby the I.D. tags are implemented using one- or two-dimensional bar codes 250 and the information receiving device 39 is implemented using a portable bar code reading device 252 that is communicatively coupled to computer 200 by an RF link to a receiver 256 that is coupled to computer 200 by either a cable or via a satellite 260 and a satellite receiver 262. With this implementation, an incident commander may read a bar code 250 using reader 252 in a location remote from computer 200. When the data is read from bar code 250, portable reading device 252 translates the information read into an electrical signal that is modulated onto an RF carrier signal and transmitted through antenna 254 to an antenna 258 of receiver 256. Receiver 256 may demodulate the received signal and provide it over the cable to computer 200 or it may relay the signal to a satellite 260 that, in turn, relays the information to a satellite receiver 262 attached by cable to computer 200. The embodiment shown in FIG. 13 provides several advantages in that the computer system 200 need not be portable and/or need not be provided separately at each location where a reading device is used. Further, by providing a satellite link between the receiver 256 and computer 200, computer 200 may be maintained at a central location. It will be appreciated by those skilled in the art, that this satellite link between an information receiving device 39 and the computer 200 may be used in any of the other described embodiments.

Figure 14:
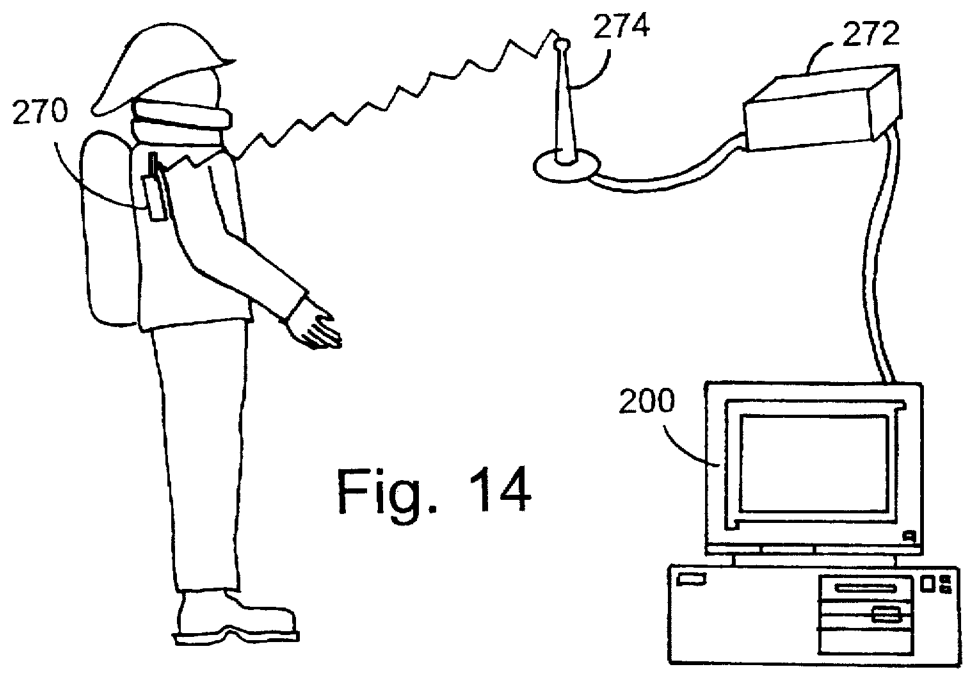
FIG. 14 is a perspective illustration of an implementation of the present invention according to a seventh embodiment.

FIG. 14 shows a seventh embodiment of the present invention whereby the I.D. tags are implemented using transmitters 270 that are attached to the firefighter's equipment and whereby the information receiving device 39 is implemented using an antenna 274 connected to a receiver or transceiver 272 coupled to a computer 200. In this embodiment, a transmitter 270 may be actuated to transmit the firefighter's identification and other information without requiring the firefighter to press any buttons on the transmitter. For example, transmitter 270 may be switched on when the firefighter puts on his gear such that it may continuously or periodically transmit the information at all times that it is turned on. Alternatively, transmitter 270 may include a receiver for receiving an interrogation signal from transceiver 272 that causes-transmitter 270 to respond by transmitting the information stored in a connected memory device to antenna 274. Further, if it is desired to avoid including a battery or other power source in transmitter 270, transmitter 270 may be configured to store the energy received from an interrogation signal and to subsequently utilize this stored energy to transmit the information stored in its memory device.

Figure 15:
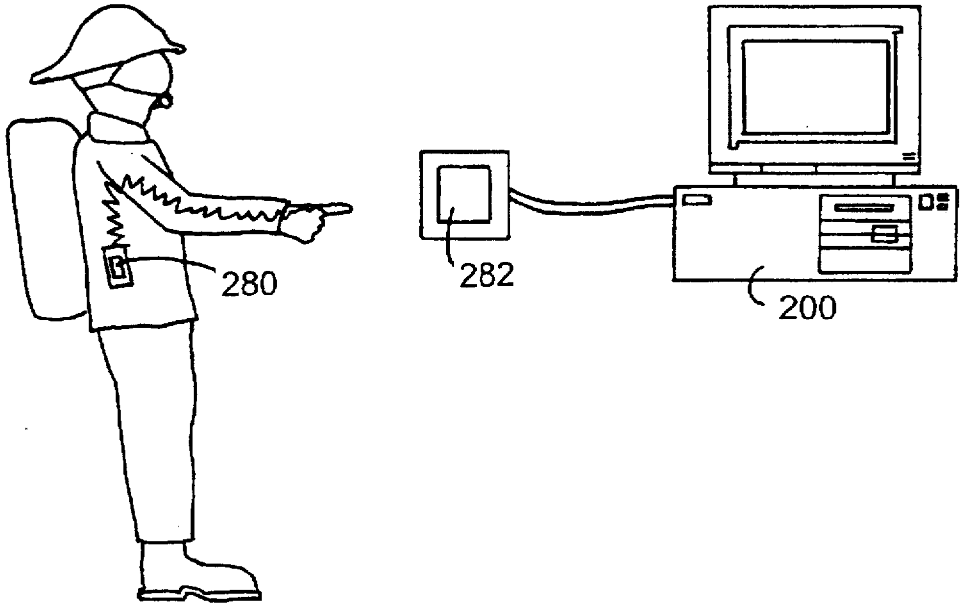
FIG. 15 is a perspective illustration of an implementation of the present invention according to a eighth embodiment.

FIG. 15 shows an eighth embodiment of the present invention whereby the I.D. tags are implemented using electronic I.D. tags provided in electrical contact with the firefighter's body and in which the information receiving device 39 is implemented using a touch receiver 282 coupled to a computer 200. In operation, when the firefighter reports to a staging area, the firefighter touches touch receiver 282 to provide a conduit path for the information stored in electronic I.D. tag 280 to be read by touch receiver 282 and relayed to computer 200.

Figure 16:
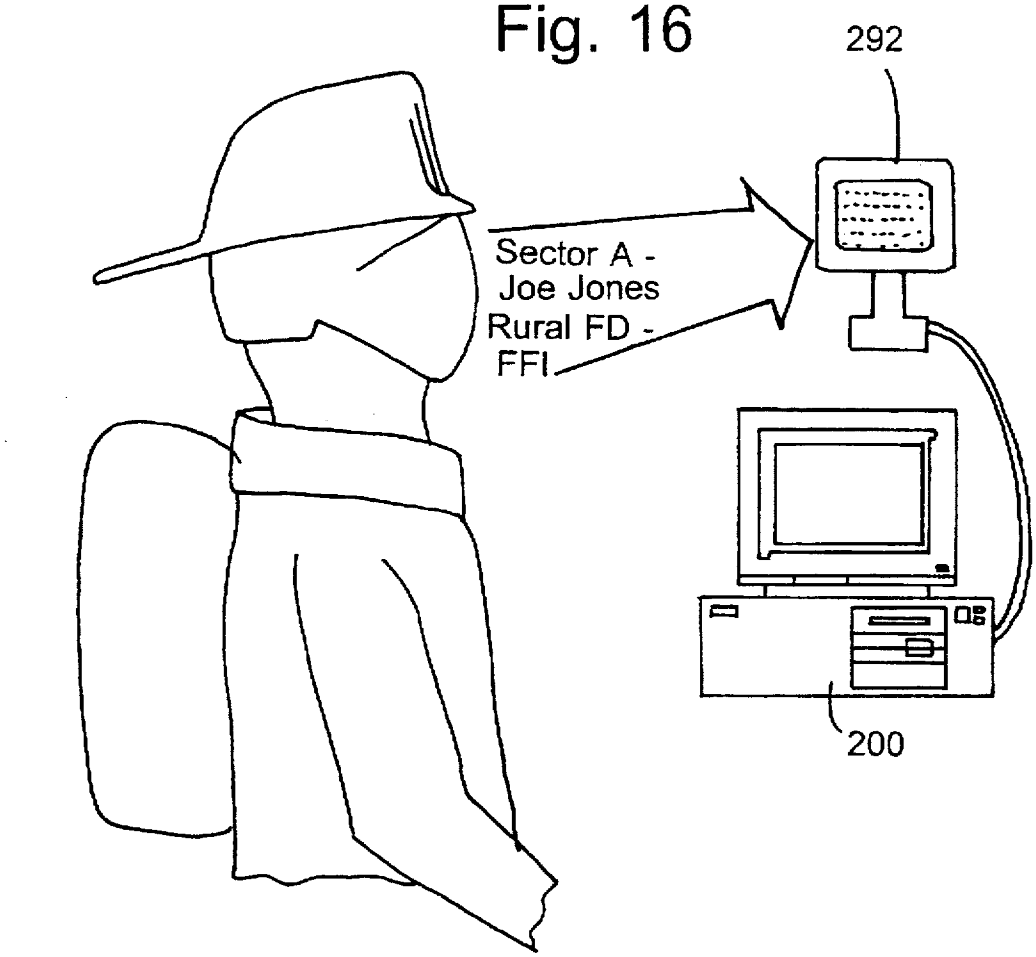
FIG. 16 is a perspective illustration of an implementation of the present invention according to a ninth embodiment.

FIG. 16 shows a ninth embodiment of the present invention whereby the information receiving device 39 is implemented using a microphone 292 coupled to a voice recognition board provided within a computer 200. In this implementation, the I.D. tags may be eliminated by having the firefighter provide identification and/or other information to computer 200 by speaking into microphone 292.

It will be appreciated by those skilled in the art that various features of the above embodiments may be combined and that the systems used in these embodiments may take various forms. For example, as will be clear from the following description of but one application of the above-described embodiments, more than one information receiving device may be coupled to computer 200. Further, in each of the various implementations of the I.D. tags described above, the information stored in the tags and received by the information receiving device 39 may include a person's identification information as well as other information pertaining to that person, such as the person's qualification information.

Although the above embodiments may be used in many different applications and environments, the following description of the application of these embodiments for use by firefighters is provided to illustrate but one of the possible applications in some detail.

Figure 2:
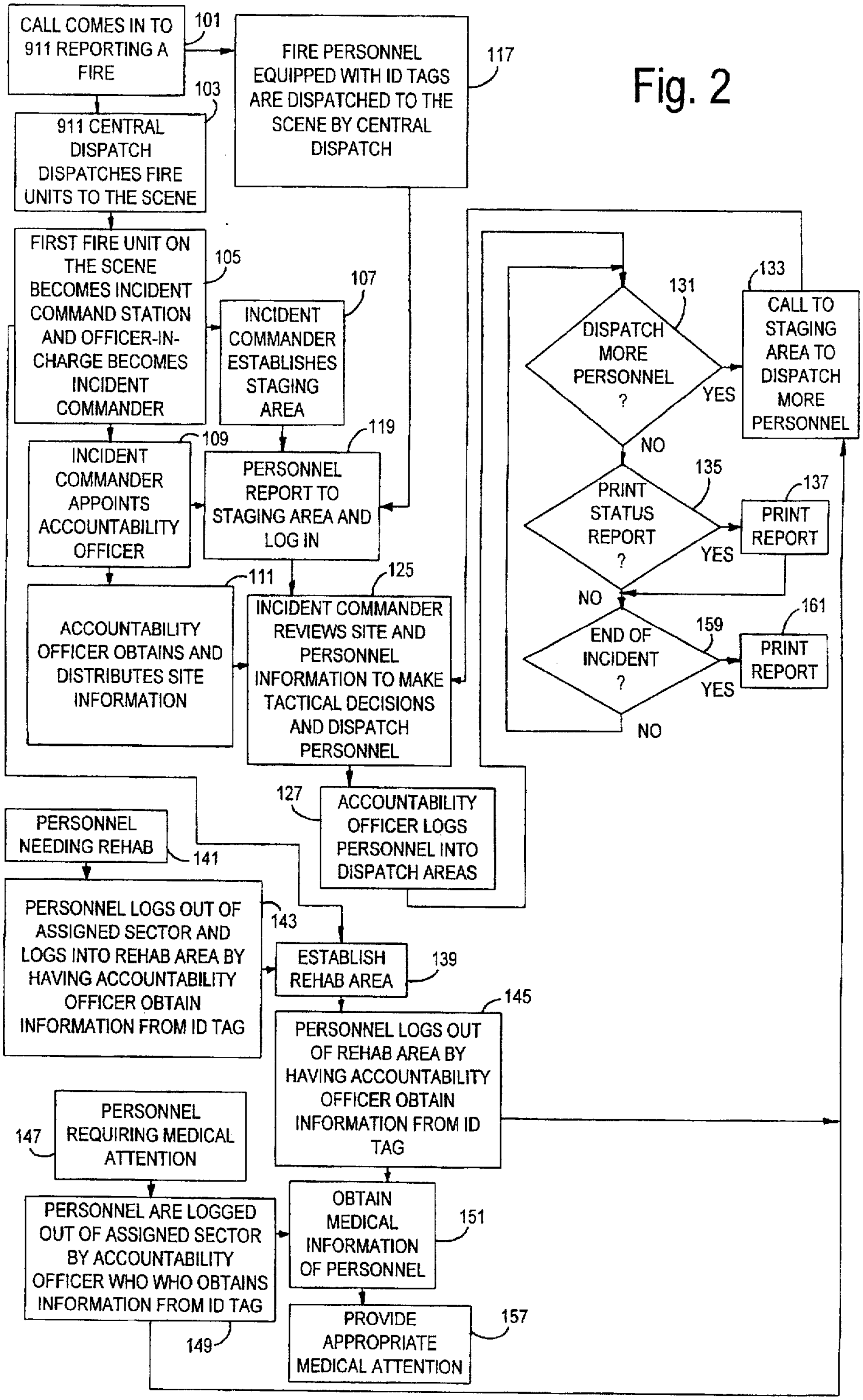
FIG. 2 is a flow diagram showing the overall flow of events that would typically occur at the scene of an emergency as a result of implementing the present invention.

FIG. 2 illustrates one example of the overall flow of events that would typically occur at the scene of an emergency when the personnel accountability system of the present invention is implemented. The first event typically occurring is a call to 911 reporting a fire or other emergency (step 101). Upon receiving a call, the 911 central dispatch dispatches fire units to the scene (step 103). The first dispatched vehicle arriving at the scene assumes the role as the incident command station and the officer-in-charge of the first emergency vehicle becomes the incident commander (step 105). The incident commander's first tasks are to establish a staging area (step 107) and to appoint an accountability officer (step 109). The accountability officer obtains and distributes site information that may be stored in a block of machine-readable data located in a nearby lockbox or that may be remotely transmitted to information receiver 39 or some other receiver used with the system from a location associated with the site (step 111). In the case of an overturned hazardous-material (hazmat) truck, the site information may be contained in a large two-dimensional bar code printed on the side of the trailer or it may be transmitted from a transmitter located in or on the truck.

Figure 3:
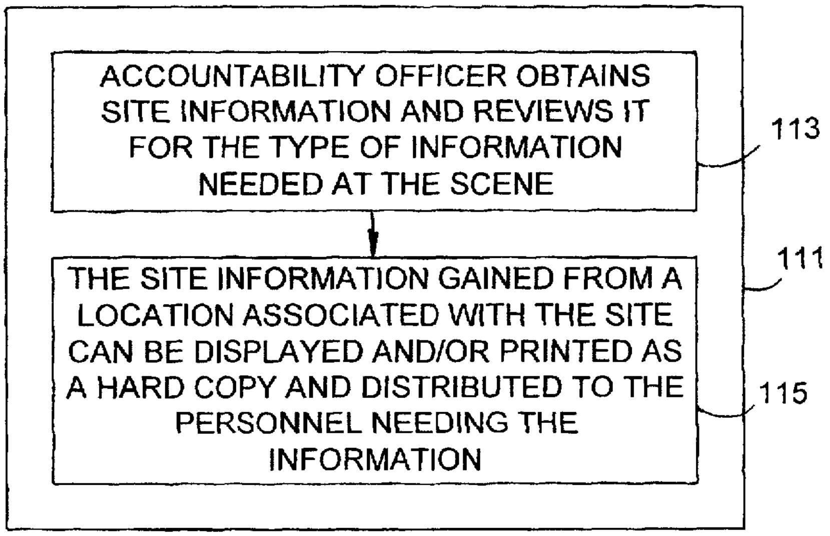
FIG. 3 is a flow diagram showing the flow of events that would typically occur to obtain site information using the present invention.

The manner by which the accountability officer obtains and distributes site information is illustrated in the flow chart shown in FIG. 3. After locating the lockbox in which the desired site information is stored, the accountability officer removes the site information and obtains information from a data storage device maintained within the lockbox using a data receiving device, such as data receiver 39 of computer hardware system 20, such that the obtained site information may be stored, displayed, and/or printed by computer hardware system 20 (step 113). Alternatively, the site information may be obtained using data receiver 39 from a transmitter associated with the site. Such a transmitter may be controlled to transmit the site information when interrogated by a remote transmitter or to continuously or periodically transmit the site information with a distress signal.

The site information that may include floor plans, blueprints, photographs of interior portions of the site, fire inspection reports, MSDS, spill abatement procedures, Tier-Two reports, and locations and identification of stored hazardous materials, utility shut-offs, and gas lines. Clearly, any other information regarding the site that may also be beneficial to emergency personnel may also be provided. For example, if the site utilizes an employee/personnel tracking system, the site information may include the last know location of any person at the site. If this dynamic information is available and other static information such as the building floor plans are also available, the dynamic personnel location information may be obtained by means such as RF transmission from the personnel tracking system, and displayed graphically by overlaying the locations of individuals on the floor plans. In this manner, emergency services personnel may be immediately informed of whether people are trapped inside a building, and if so, where they are located within the building. Further, the system of the present invention could then be used to assign the arriving emergency services personnel that are qualified for such rescue to the locations of the site in which people may be trapped. In another application, this methodology may be used by rescue personnel to identify the location of workers on a floating oil rig in the event of an emergency. In yet another application, this methodology could be used by prison officials, police, national guard units, etc. to identify the location of prisoners within a site (i.e., prison) during a lock-down.

After the accountability officer has obtained all the site information, the accountability officer may print out hard copies of any of the site information for distribution to the personnel needing the information (step 115). Thus, firefighters arriving at the scene of an emergency may greatly benefit by having access to site information they otherwise could not have obtained. Site information of the nature discussed above greatly improves firefighters'efficiency in fighting the fire and further improves the safety of the firefighters.

In addition to dispatching fire units to the scene, the 911 central dispatch also dispatches fire personnel to the scene by calling them on radios (step 117). Preferably, the dispatched fire personnel will already be equipped with an I.D. tag and at least one medical information tag that each include some form of storage medium from which stored data may be transferred to data receiver 39. The I.D. tag may be provided on or within a waterproof and fireproof material that can be sewn on, or applied to, garments or fabrics. An example of such a material is Teslin manufactured by Pittsburgh Paint and Glass, and Nomix manufactured by Du Pont. The I.D. tags may be attached by Velcro™ to the storm flap of the firefighter's turnout coat or to any other portion of the firefighter's gear. Preferably, the information contained on these I.D. tags includes a firefighter's name, battalion or unit, levels of completed training, and experience in fighting various types of fires.

The medical information tags may also be provided on or within a fireproof and waterproof fabric or on a card that may be kept inside the firefighter's helmet and/or in the pocket of the firefighter's turnout coat. Preferably, the medical information tags include the individual medical history, such as allergy information, medications being taken, hospital preference, insurance information, doctor's name and telephone number, and a list of individuals to contact in case of an emergency.

Figure 4:
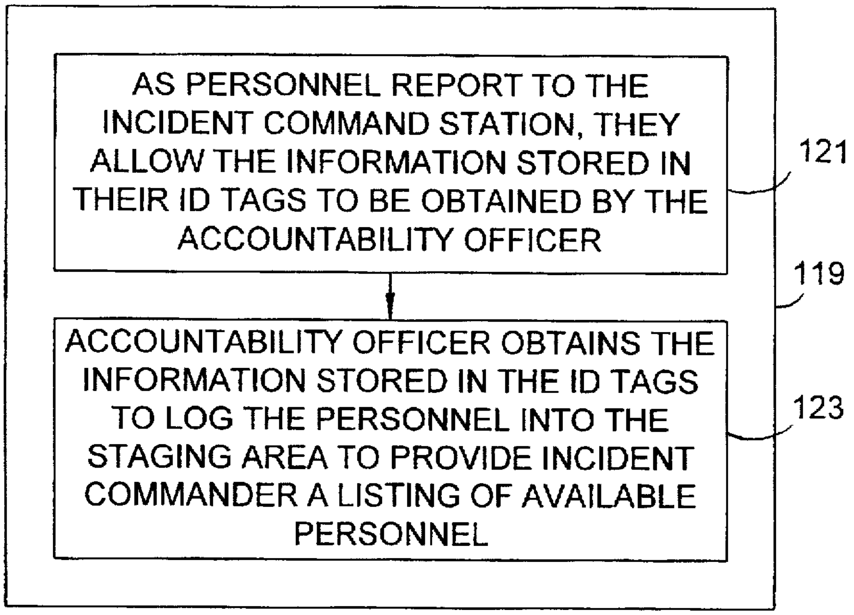
FIG. 4 is a flow diagram showing the flow of events that would typically occur to log in personnel using the present invention.

As the fire personnel arrive at the scene, they report to the staging area to log into the system (step 119). FIG. 4 illustrates the manner by which personnel are logged into the system. At the staging area, the arriving personnel allow the information stored in their I.D. tags to be obtained by the accountability officer (step 121). The accountability officer then uses the information obtained from the I.D. tags to log in personnel into the staging area, thus compiling a listing of the personnel available for dispatch (step 123). Referring back to FIG. 2, the incident commander now has available site information, which is a compilation of all the interior locations of things that are in the building that a firefighter needs to know, such as where the shut-offs are, the gas and the water are, where the elevators are, who to contact in case of an emergency, where the high value salvage areas are, where the hazardous materials are and how much of it is there, fire inspection reports, MSDS, Tier-Two reports, site drawings of the building and photographs of the interior, and has a listing of the personnel available for dispatch that includes the level of training and experience of each of the available personnel. Having all this information available, the incident commander can make informed tactical decisions for fighting the fire and for insuring that a firefighter is not dispatched to a sector that may have a particular type of fire therein which the firefighter is not qualified to fight. Moreover, by having the site information, the incident commander can actually use this information to direct firefighters in the actual interior of the building from the outside of the building using the photographs of the interior, as well as the floor plan. Thus, the incident commander may insure that firefighting personnel are dispatched in the most effective and efficient manner by reviewing the listing of available personnel and their qualifications in light of the information contained in the site information.

Figure 5:
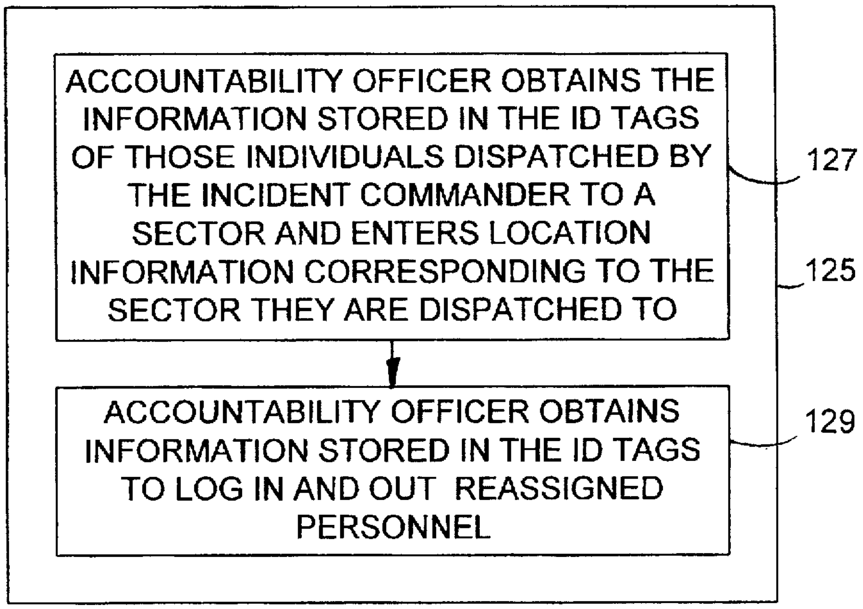
FIG. 5 is a flow diagram showing the flow of events that would typically occur to dispatch personnel using the present invention.

After the incident commander has made a decision to dispatch a particular person to a particular area of the site, the accountability officer logs that person into the assigned area (step 127). FIG. 5 illustrates the manner by which personnel are logged into or out of a particular area by the accountability officer. First, the accountability officer obtains the information stored in the I.D. tag of those firefighters dispatched by the incident commander to a particular sector and then enters location information into the system identifying the particular sector to which the firefighters are dispatched (step 127). The sectors are defined using predetermined methods whereby the site is divided into quadrants and each quadrant represents a sector. These sectors may be divided into subsectors depending on the size of the site. The location information may be entered reading a bar code that identifies a particular sector, by reading data from a touch memory device or smart card associated with that sector, or by entering the location information directly into the system using a keyboard, mouse, touchscreen or any other input device. Thus, by using a predetermined method of identifying sectors at a site, location tags may be prepared in advance on a single sheet of paper. After the personnel are assigned to a sector, they may be reassigned to another sector or logged out of the sector by the accountability officer who enters the information stored on their I.D. tags (step 129).

Returning to FIG. 2, at any time additional personnel need to be or are available to be dispatched (step 131), a call may be placed to the staging area to dispatch more personnel (step 133). Further, should the incident commander wish to review an up-to-date status report (step 135), he can print a report at any time including the current assignment status of all personnel on the fire scene, where they are, what they are trained to do, and their log in times (step 137).

Another task performed by the incident commander is to establish a rehab area where firefighters may obtain or replace an air tank or otherwise obtain relief (step 139). Thus, when any person requires rehab (step 141), they report to the rehab area where they are or logged out of their assigned sector and logged into the rehab area by having the information stored in their I.D. tags read into the system (step 143). When firefighters are ready to report back to the scene, the firefighters log out of the rehab area by again having the information stored in their I.D. tags read into the system (step 145) and report to the staging area to be dispatched (step 133).

Should personnel require medical attention (step 147), they would log out of their assigned sector by having the information stored in their I.D. tag read into the system (step 149) or, if in the rehab area, they would log out of the rehab area by again having the information stored in their I.D. tag read into the system (step 145). This logging out procedure may be carried out by medical personnel calling the staging area, so that the accountability officer may log the person requiring medical attention out of their assigned sector (step 133). The medical personnel may then immediately obtain the person's medical information by reading the information stored in one of the medical information tags carried on the firefighter's equipment (step 151).

The manner by which the medical personnel obtain this medical information is illustrated in FIG. 6. . After obtaining the medical information from the medical tag, the medical personnel may display the obtained information on a display monitor or print out a hard copy of this information (step 153). FIG. 10 shows an example of a display screen or report including the medical information that may be contained in a bar code. This medical information may then be handed to ambulance personnel or to personnel at a hospital (step 155). Because seconds may mean the difference between life or death for an injured firefighter, immediate access to medical information may be crucial. By placing the medical record on the firefighter, medical personnel may immediately obtain the firefighter's medical record, and give the prognosis and medical records to the hospital over the radio or fax it to them. Thus, the medical information will be readily available so that immediate medical attention may be given to the injured firefighter (step 157). Additionally, upon arrival at the hospital, the firefighter may be immediately admitted to the emergency room without experiencing the routine delay typically encountered when such medical information is required before admittance.

After the fire has been put out and the fire personnel have been discharged, a report may be printed to fully reconstruct the deployment of personnel including which personnel were dispatched, where the personnel were dispatched, and the time each person spent in each area (steps 159 and 161).

Although the above example has been described with respect to deployment of firefighting personnel at the scene of an emergency, it will be appreciated that the personnel accountability system of the present invention may be employed to track any type of personnel and that the present invention is particularly suited for tracking safety and hazardous-duty personnel including police, paramedics, miners, military personnel, combat personnel, forest rangers, and construction workers at locations in which such personnel may be deployed. In such applications, the information contained in the I.D. tags would vary to suit the needs for each different application.

Additionally, although the above example refers to the use of the system of the present invention to assign personnel to a particular sector of an emergency site, the system could be used to assign non-location specific tasks based upon the person's qualifications and to account for personnel at any other form of non-emergency site or work site.

Further, although various specific implementations have been described for presenting machine-readable data, other forms of machine-readable data, such magnetic strips, or machine-readable data implemented using sonic or optical character recognition (OCR) technologies, or the like may also be used to practice the present invention.

The above-described embodiment was chosen for purposes of describing but one application of the invention. It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A method for accounting for personnel at a site using a portable information receiving device that is communicatively coupled to a computer, the method comprising the steps of:

- transporting the portable information receiving device to a site;
- using the information receiving device for receiving machine-recognizable information that is associated with a person arriving at the site and includes the person's identification, in order to log that person into the computer;
- determining the person's qualifications based upon information obtained by the processing the person's information received by the information receiving device so that the person arriving at the site can be assigned to a task and/or location to which the person is qualified to work;
- assigning the person to a task and/or location of the site based upon the person's qualifications; and
- recording in the computer the task and/or location to which the person is assigned.

2. The method as defined in claim 1, wherein the information receiving device includes an RF receiver and the machine-recognizable information is stored in a memory device of an RF transmitter carried by the personnel, and is transmitted in an RF signal to the RF receiver.

3. The method as defined in claim 2, wherein the step of receiving the machine-recognizable information is initiated by actuating a button on the RF transmitter.

4. The method as defined in claim 2, wherein the step of receiving the machine-recognizable information is initiated when the personnel carrying the RF transmitter comes into near proximity an antenna of the RF receiver.

5. The method as defined in claim 2, wherein the step of receiving the machine-recognizable information is initiated by transmitting an interrogation signal to a receiver coupled to the RF transmitter, which responds by transmitting an RF signal including the information to the RF receiver.

6. The method as defined in claim 1, wherein the information receiving device includes a touch-sensitive receiver and the machine-recognizable information is stored in a memory device carried by the personnel.

7. The method as defined in claim 6, wherein the memory device is carried in electrical contact with the personnel's body and the step of receiving the machine-recognizable information is performed by the personnel touching the touch-sensitive receiver.

8. The method as defined in claim 6, wherein the memory device is a touch memory button and the step of receiving the machine-recognizable information is performed by the touching the touch memory button with the touch-sensitive receiver.

9. The method as defined in claim 1, wherein the information receiving device includes a card reading device and the machine-recognizable information is stored in a memory device of a card carried by the personnel.

10. The method as defined in claim 1, wherein the information receiving device includes an infrared receiver and the machine-recognizable information is stored in a memory device of an infrared transmitter carried by the personnel, and is transmitted in an infrared signal to the infrared receiver.

11. The method as defined in claim 1, wherein the information receiving device includes a microphone coupled to a voice recognition device and the step of receiving the machine-recognizable information is performed by the personnel speaking into the microphone.

12. The method as defined in claim 1, wherein the information receiving device includes a bar code reader and the machine-recognizable information is stored in a bar code carried by the personnel.

13. The method as defined in claim 12, wherein the bar code reader includes a transmitter for transmitting data read from the bar code to a receiver coupled to the computer.

14. The method as defined in claim 13, wherein the receiver is coupled to the computer via a satellite link.

15. A method for accounting for firefighting personnel at the scene of an emergency comprising the steps sequentially performed of:

using an information receiving device to read machine-recognizable information associated with and carried by a firefighter arriving at the scene in order to log that firefighter into a computer;

determining the firefighter's qualifications based upon information included within the machine-recognizable information associated with the firefighter received by the information receiving device;

assigning the firefighter to a task and/or sector of the scene based upon the firefighter's qualifications; and recording in the computer the task and/or sector to which the firefighter is assigned.

16. The method as defined in claim 15, wherein the information receiving device includes an RF receiver and the machine-recognizable information is stored in a memory device of an RF transmitter carried by the personnel, and is transmitted in an RF signal to the RF receiver.

17. The method as defined in claim 16, wherein the step of receiving the machine-recognizable information is initiated by actuating a button on the RF transmitter.

18. The method as defined in claim 16, wherein the step of receiving the machine-recognizable information is initiated when the personnel carrying the RF transmitter comes into near proximity an antenna of the RF receiver.

19. The method as defined in claim 16, wherein the step of receiving the machine-recognizable information is initiated by transmitting an interrogation signal to a receiver coupled to the RF transmitter, which responds by transmitting an RF signal including the information to the RF receiver.

20. The method as defined in claim 15, wherein the information receiving device includes a touch-sensitive receiver and the machine-recognizable information is stored in a memory device carried by the personnel.

21. The method as defined in claim 20, wherein the memory device is carried in electrical contact with the personnel's body and the step of receiving the machine-recognizable information is performed by the personnel touching the touch-sensitive receiver.

22. The method as defined in claim 20, wherein the memory device is a touch memory button and the step of receiving the machine-recognizable information is performed by the touching the touch memory button with the touch-sensitive receiver.

23. The method as defined in claim 15, wherein the information receiving device includes a card reading device and the machine-recognizable information is stored in a memory device of a card carried by the personnel.

24. The method as defined in claim 15, wherein the information receiving device includes an infrared receiver and the machine-recognizable information is stored in a memory device of an infrared transmitter carried by the personnel, and is transmitted in an infrared signal to the infrared receiver.

25. The method as defined in claim 15, wherein the information receiving device includes a microphone coupled to a voice recognition device and the step of receiving the machine-recognizable information is performed by the personnel speaking into the microphone.

26. The method as defined in claim 15, wherein the information receiving device includes a bar code reader and the machine-recognizable information is stored in a bar code carried by the personnel.

27. The method as defined in claim 26, wherein the bar code reader includes a transmitter for transmitting data read from the bar code to a receiver coupled to the computer.

28. The method as defined in claim 27, wherein the receiver is coupled to the computer via a satellite link.

29. A method for accounting for personnel at a site comprising the steps of:

receiving an RF signal that is associated with a person arriving at the site and includes the person's identification and the person's qualification information, in order to log that person into a computer so that the person arriving at the site can be assigned to a sector in which the person is qualified to work;

determining the person's qualifications based upon information obtained from the received RF signal;

assigning the person to a task and/or sector of the site based upon the person's qualifications; and recording in the computer the task and/or sector to which the person is assigned.

30. The method as defined in claim 29, wherein the step of receiving an RF signal is initiated by actuating a button on an RF transmitter carried by the person arriving at the site.

31. The method as defined in claim 29, wherein the step of receiving an RF signal is initiated when a person arriving at the site and carrying an RF transmitter comes into near proximity an antenna of an RF receiver.

32. The method as defined in claim 29, wherein the step of receiving an RF signal is initiated by transmitting an interrogation signal to a receiver connected to an RF transmitter, which responds to the interrogation signal by transmitting an RF signal including the information to an RF receiver connected to the computer.

33. A method for accounting for personnel at a site comprising the steps of:

receiving an infrared signal that is associated with a person arriving at the site and includes the person's identification and the person's qualification information, in order to log that person into a computer so that the person arriving at the site can be assigned to a sector in which the person is qualified to work;

determining the person's qualifications based upon information obtained from the received infrared signal;

assigning the person to a task and/or sector of the site based upon the person's qualifications; and recording in the computer the task and/or sector to which the person is assigned.

34. A method for accounting for personnel at a site comprising the steps of:

reading information stored in a touch memory device that is associated with a person arriving at the site and includes the person's identification and the person's qualification information, in order to log that person into a computer so that the person arriving at the site can be assigned to a sector in which the person is qualified to work;

determining the person's qualifications based upon information obtained from the information read from the touch memory device;

assigning the person to a task and/or sector of the site based upon the person's qualifications; and recording in the computer the task and/or sector to which the person is assigned.

35. A method for accounting for personnel at a site comprising the steps of:

reading information stored in a memory device that is electrically coupled to and associated with a person arriving at the site, the information including the person's identification and the person's qualification information, in order to log that person into a computer so that the person arriving at the site can be assigned to a sector in which the person is qualified to work, the information being read from the memory device by having the person touch a touch-sensitive receiver;

determining the person's qualifications based upon information obtained from the information read from the memory device;

assigning the person to a task and/or sector of the site based upon the person's qualifications; and recording in the computer the task and/or sector to which the person is assigned.

36. A method for accounting for personnel at a site comprising the steps of:

reading information stored in a memory device on a smart card that is associated with a person arriving at the site and includes the person's identification and the person's qualification information, in order to log that person into a computer so that the person arriving at the site can be assigned to a sector in which the person is qualified to work;

determining the person's qualifications based upon information obtained from the information read from the memory device on the smart card;

assigning the person to a task and/or sector of the site based upon the person's qualifications; and recording in the computer the task and/or sector to which the person is assigned.

37. A method for accounting for personnel at a site comprising the steps of:

reading a two-dimensional bar code that is associated with a person arriving at the site and includes the person's identification and the person's qualification information, in order to log that person into a computer so that the person arriving at the site can be assigned to a sector in which the person is qualified to work;

transmitting data representing the information read from the two dimensional bar code to a receiver coupled to the computer;

determining the person's qualifications based upon information obtained from the transmitted data;

assigning the person to a task and/or sector of the site based upon the person's qualifications; and recording in the computer the task and/or sector to which the person is assigned.

38. The method as defined in claim 37 and further including the steps of:

transmitting the data received by the receiver to a satellite; and receiving data from the satellite and providing it to the computer where the step of determining the person's qualifications is performed.

39. A method for providing personnel with information about a site of an emergency, comprising the steps of:

using a portable receiving device for receiving data associated with the site;

obtaining information about the site that is represented by the received data; and displaying the obtained information to the emergency services personnel on a display device operatively coupled to the portable receiving device, wherein the information represented by the received data associated with the site includes at least one of a floor plan, a blueprint, a photograph of an interior portion of the site, a fire inspection report, and locations and identification of stored hazardous materials, utility shut-offs, and gas lines.

40. The method as defined in claim 39 and further including the step of:

receiving information identifying the last known location of any people remaining within the site; and displaying the locations of any people remaining within the site.

* * * * *

UNITED STATES PATENT AND TRADEMARK OFFICE

CERTIFICATE OF CORRECTION

PATENT NO. : 5,793,882
DATED : August 11, 1998
INVENTOR(S) : John T. Piatek et al.

It is certified that error appears in the above-identified patent and that said Letters Patent is hereby corrected as shown below:

Cover page, in the Related U.S. Application Data, "Mar. 24, 1995" should be --Mar. 23, 1995--.

Column 1, lines 10 and 11, "Mar. 4, 1995" should be --Mar. 23, 1995--.

Signed and Sealed this

Fourth Day of May, 1999

*Attest:*

Q. TODD DICKINSON

*Attesting Officer*

*Acting Commissioner of Patents and Trademarks*